(12) United States Patent  
Flory

(10) Patent No.: US 7,531,795 B2  
(45) Date of Patent: May 12, 2009

(54) SCANNING MICROSCOPY USING RESONANT QUANTUM TUNNELING

(75) Inventor: Curt A Flory, Los Altos, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 279 days.

(21) Appl. No.: 11/668,366

(22) Filed: Jan. 29, 2007

(65) Prior Publication Data

US 2008/0179516 A1    Jul. 31, 2008

(51) Int. Cl.  
*G01N 23/00* (2006.01)

(52) U.S. Cl. .......................................... 250/306; 73/105
(58) Field of Classification Search .................. 250/306, 250/307; 73/105  
See application file for complete search history.

(56) References Cited

U.S. PATENT DOCUMENTS 7,410,564 B2 * 8/2008 Flory ....................... 205/777.5

* cited by examiner

*Primary Examiner*—Kiet T Nguyen

(57) ABSTRACT

In accordance with the invention, resonant quantum tunneling microscopy allows surface imaging while allowing characterization of physical properties associated with the surface.

20 Claims, 7 Drawing Sheets

SCANNING MICROSCOPY USING RESONANT QUANTUM TUNNELING

BACKGROUND

Scanning probe methods are being used to study an increasing range of surface phenomena. These surface phenomena include surface topography, dielectric and magnetic properties, molecular manipulation and many other effects that occur on the micrometer to the subnanometer scale. Scanning probe microscopes include scanning tunneling microscopes (STMs) and atomic force microscopes (AFMs). Both STMs and AFMs utilize a sharp probe tip to interact with the target surface to generate a topographic surface scan. The parameters used for image formation are different for STMs and AFMs. In an STM system, the modulations of the tunneling current are used to determine surface topography while in an AFM system, the varying force between the probe tip and the target surface is used to determine the surface topography.

STM systems may also be employed to monitor the tunneling current versus the bias voltage at fixed locations on the target surface. The STM probe tip is positioned at a particular location above the target surface. A spectrum is produced by sweeping the bias voltage and measuring the tunneling current. This provides information regarding the density of surface states in the target surface proximate to the STM probe tip.

The use of STM and AFM systems has enabled relatively routine imaging of surfaces at nanoscale resolutions, but more information may be desired about the surface. A desirable measurement modality is one that allows surface imaging of unaltered samples while at the same time providing a means for characterizing a physical property associated with the localized target surface.

SUMMARY

In accordance with the invention, resonant quantum tunneling microscopy allows surface imaging while allowing characterization of physical properties associated with the surface.

DETAILED DESCRIPTION

Figure 1A:
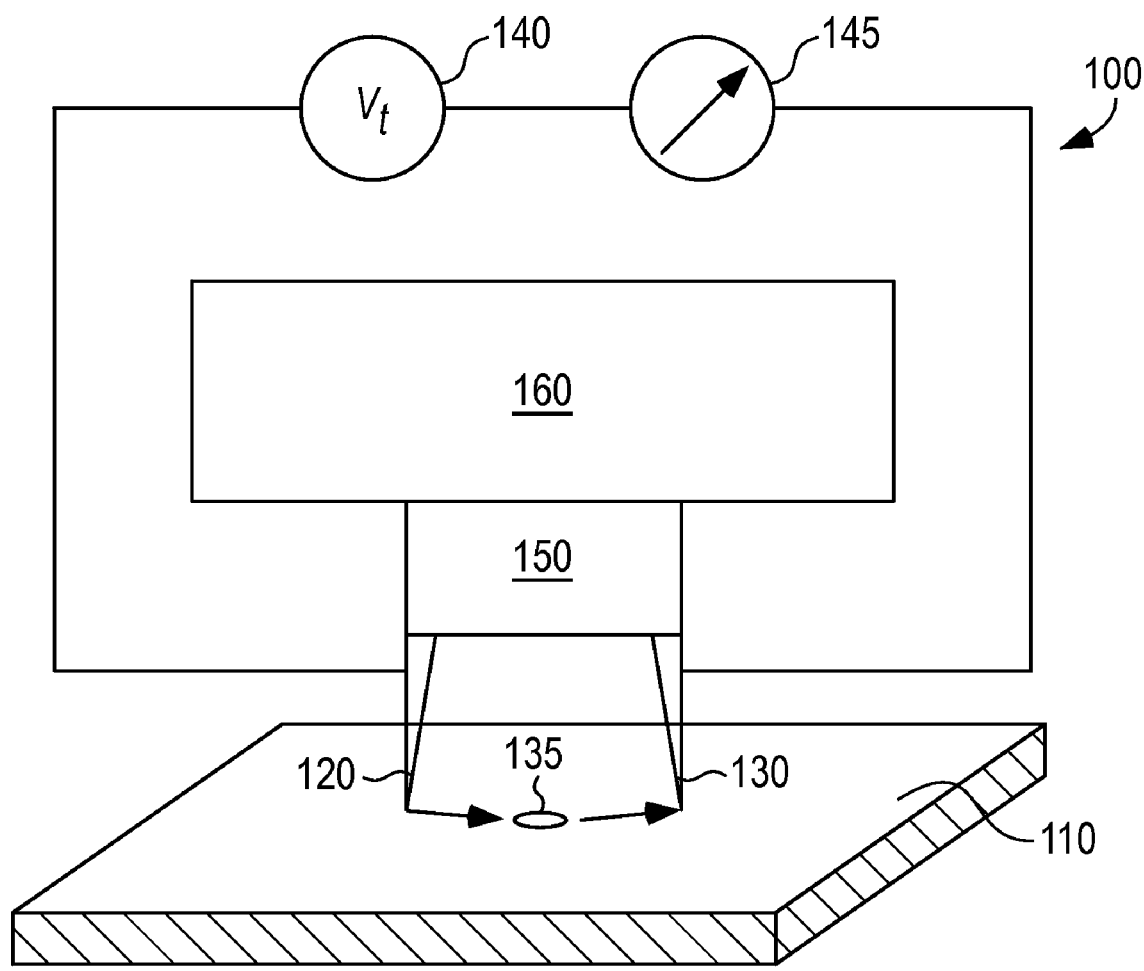
FIGS. 1a-b show embodiments in accordance with the invention.

An embodiment in accordance with the invention is shown in FIG. 1a. Typically, two sharp conducting metal wires or conducting carbon nanotubes are used for tunneling electrodes 120 and 130 for Resonant Quantum Tunneling Scanning Microscope (RQTSM) 100. Tunneling electrodes 120 and 130 are attached to tip support structure 150 which may be attached to, for example, insulating xyz scanner 160, similar to that used in standard atomic force microscope systems. Typically the positioning performed by an xyz stage is actuated by a piezoelectric tube under the influence of applied electric fields although other well-known positioning means may be used. Alternatively, tip support structure 150 may be attached to a fixed or z motion only structure while target surface 110 is positioned on an xyz stage or xy stage (not shown), respectively. The xyz or xy stage may be actuated by a piezoelectric tube while the z-motion structure, for example, may be actuated using a MEMS device such as a electrostatic stepper motor or an electrostatic comb drive. In accordance with the invention, target surface 110 is typically an insulating surface so that purely tunneling currents predominate over unwanted conduction processes. However, target surfaces with limited conductive properties may also be examined, with the level of allowable conductivity being determined by the measurement requirements.

Tip support structure 150 functions as the base to which tunneling electrodes 120 and 130 are attached and can be made in a manner similar to the way that SPM support structures are manufactured. SPM support structures may be microfabricated from silicon in a manner similar to computer chips and produced to have a pyramidal shape. In order for tip support structure 150 to be insulating, the silicon can be oxidized prior to the attachment or growth of tunneling electrodes 120 and 130. Other typical methods of fabricating appropriately dimensioned and insulating tip support structure 150 may also be used. Tunneling electrodes 120 and 130 may be attached to tip support structure 150 in a number of ways in accordance with the invention. For example, small metal precursor regions may be lithographically patterned and deposited on tip support structure 150. The carbon nanotubes are then grown (e.g., M. Jose-Yacaman, M. Miki-Yoshida, L. Rendon, T. Santiesteban, Appl. Phys. Lett. 62, 202 (1993) incorporated herein by reference) on the small metal precursor regions to form tunneling electrodes 120 and 130. Any other available technique to attach carbon nanotubes to tip support structure 150 may also be used to create tunneling electrodes 120 and 130. Other structures may be manufactured and attached to tip support structure 150 to form tunneling electrodes 120 and 130 in accordance with the invention and includes structures typically used for STM tips. For example, a typical STM tip is made from tungsten polycrystalline wire, platinum wire or iridium wire which is electrochemically etched to provide a suitably sharp tip. Tip support structure 150 typically has a lateral dimension in the submicron range. Tunneling electrodes 120 and 130 typically have a separation on the order of nanometers or less at their furthest extent from tip support structure 150 to create adequate tunneling current, $I_T$.

Tunneling electrodes 120 and 130 are connected to variable voltage source 140 and current measuring device 145. The variable voltage source 140 and current measuring device 145 are similar to those typically used in STMs. Electrical connections to variable voltage source 140 and to current measuring device 145 from tunneling electrodes 120 and 130 may be accomplished in a number of ways in accordance with the invention. For example, metal lines may be created lithographically from the attachment sites of tunneling electrodes 120 and 130 to larger metal bonding pads (not shown). This may be accomplished during the microfabrication of tip support structure 150.

In operation, xyz scanner 160 positions tunneling electrodes 120 and 130 proximate to target surface 110 and over scanned spot 135. The tunneling voltage, $V_t$, between tunneling electrodes 120 and 130 is ramped over a prescribed range, and the tunneling current, $I_T$, is measured as a function of time using current measuring device 145. The predominant physical mechanism for generating the tunneling current is resonant quantum tunneling (RQT). The tunneling differential conductance, $\sigma=dI_T/dV_t$, for RQT peaks sharply when two physical conditions are satisfied. First, the integrated magnitudes of the tunneling barriers between tunneling electrodes 120, 130 and scanned spot 135, which functions as the intermediate well region, must be equal. Second, the Fermi energy in negatively biased tunnel electrode 120 must precisely match an energy level of scanned spot 135 which functions as the intermediate well region. The tunneling differential conductance, $\sigma$, may be enhanced by orders of magnitude when these two conditions are met.

During operation, as tunneling electrodes 120 and 130 move to each scanned spot 135 on target surface 110, the tunneling voltage, $V_t$, is ramped over the prescribed range. The precise position and extent of scanned spot 135 is self-selected by the requirement that the integrated magnitudes of the tunneling barriers between tunneling electrodes 120, 130 and scanned spot 135 are equal. Typically, this implies that scanned spot 135 is approximately equidistant from tunneling electrodes 120 and 130, although there may be some deviation, for example, if the electron emissivity of scanned spot 135 has inherent asymmetries and the effective barrier potential varies accordingly. Target surfaces with significant roughness, where the ratio of surface roughness to the spacing between tunneling electrodes 120 and 130 is less than unity will have a bias in the position of scanned spot 135; from being centered between electrodes 120 and 130 to being off-center. The spatial extent of scanned spot 135 is determined by how rapidly the tunneling probability decreases as the tunneling barriers with respect to tunneling electrodes 120 and 130 become asymmetric. Hence, even if tunneling electrodes 120 and 130 are spatially separated by a distance on the order of several nanometers, the spatial extent of scanned spot 135 is determined by the symmetry requirement for the tunneling barriers, i.e. only that limited spatial region with a symmetric barrier to tunneling electrodes 120 and 130 is interrogated. This typically results in sizes for scanned spot 135 on the order of several Angstroms. Tunneling current contributions from surface regions proximate to tunneling electrodes 120 and 130 that have asymmetric tunneling barriers contribute to background noise but this noise contribution is typically many orders of magnitude smaller than RQT currents. In directions perpendicular to the tunneling current flow, the size of scanned spot 135 is determined by tunneling suppression due to increased barrier width and not by the condition of tunneling barrier symmetry.

As the tunneling voltage, $V_t$, is ramped over the prescribed range during a measurement, the peaks in the tunneling differential conductance, $\sigma$, occur at those voltages where the Fermi energy of negatively biased tunnel electrode 120 matches an energy level of scanned spot 135. The measurement provides detailed information about the electron energy spectrum of scanned spot 135 which can be used to determine local elemental or molecular composition and deviations from expected spectra measured from control regions. The magnitude of the tunneling current, $I_T$, off-resonance can be used as a standard STM signal to obtain a measure of the separation of tunneling electrodes 120 and 130 from target surface 110 to obtain surface topography. The measured energy spectra are referenced to the potentials of tunneling electrodes 120 and 130 and surface charges or other sources of potential offsets at scanned spot 135 may produce measurable voltage shifts that may need to be considered in spectral identification.

RQTSM 100 can be used to simultaneously obtain both topographical and spectral information about target surface 110. The spatial resolution is typically substantially better than the separation distance between tunneling electrodes 120 and 130, on the order of Angstroms. Operation of RQTSM 100 may in some cases be affected by thermal noise issues which may result in signal to noise issues. A typical solution to thermal noise issues is to cool a system to low temperature where thermal broadening is less than the energy spacing between the targeted differential conductance, $\sigma$, peaks (see FIG. 4b), hence cooling of RQTSM 100 and target surface 110 may be required in some cases. Depending upon the application, this may require cooling below liquid helium temperatures. Another operational issue relates to the possibility of electrically charged or polarized contaminants in the air attaching themselves to tunneling electrodes 120 and 130 and effectively shorting out the tunneling current signal. If electrically charged or polarized contaminants are an issue, RQTSM 100 can be operated in a high vacuum environment to reduce the possibility of electrically charged or polarized contaminants.

Figure 1B:
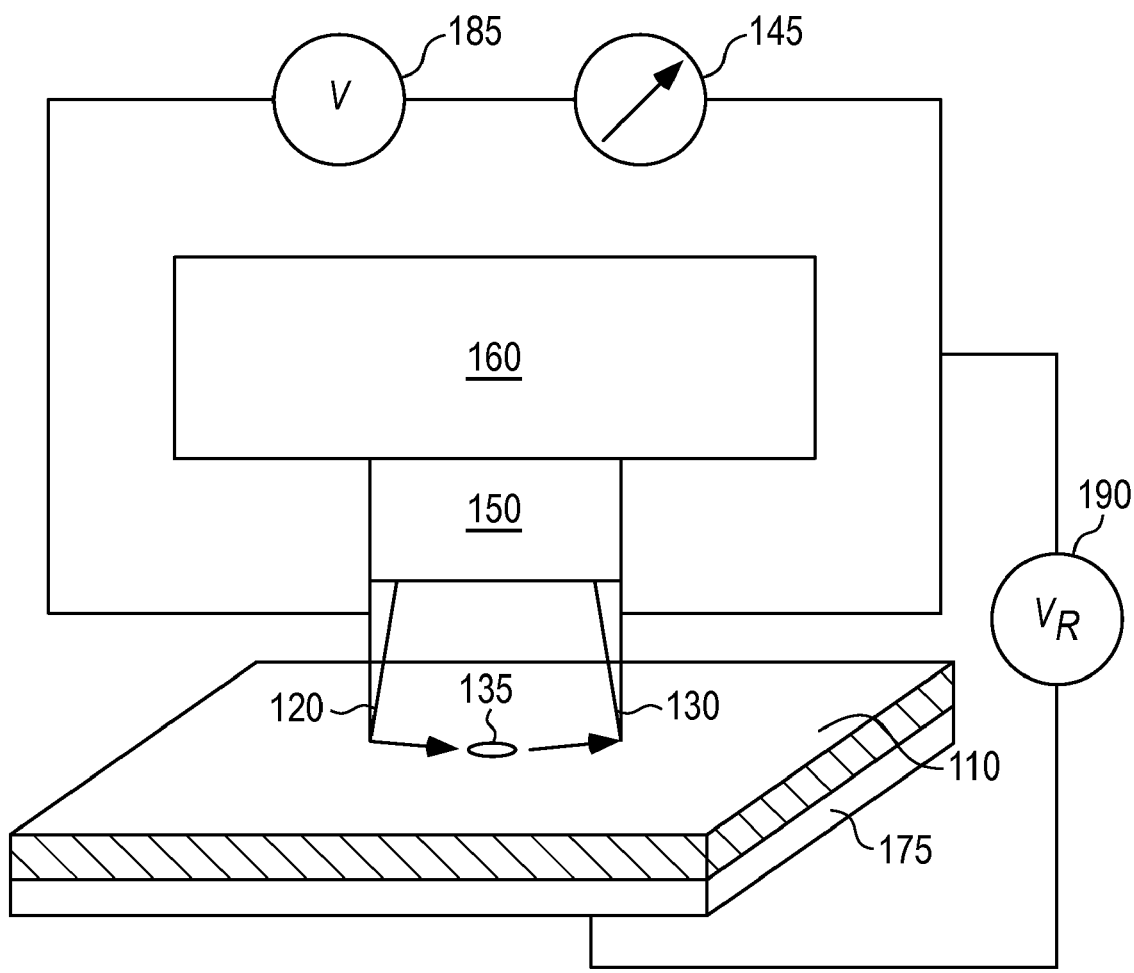

FIG. 1b shows an embodiment in accordance with the invention. Here, the tunneling voltage, $V_t$, applied between tunneling electrodes 120 and 130 is kept constant and the ramped voltage, $V_R$, is applied by ramped voltage source 190 between metal layer 175 beneath target surface 110 and voltage source 185. The tunneling current, $I_T$, and the differential conductance, $\sigma$, as a function of voltage provide the same information as in the embodiment shown in FIG. 1a. In this embodiment, the energy levels of scanned spot 135 are varied by the applied ramped voltage, $V_R$.

Figure 2:
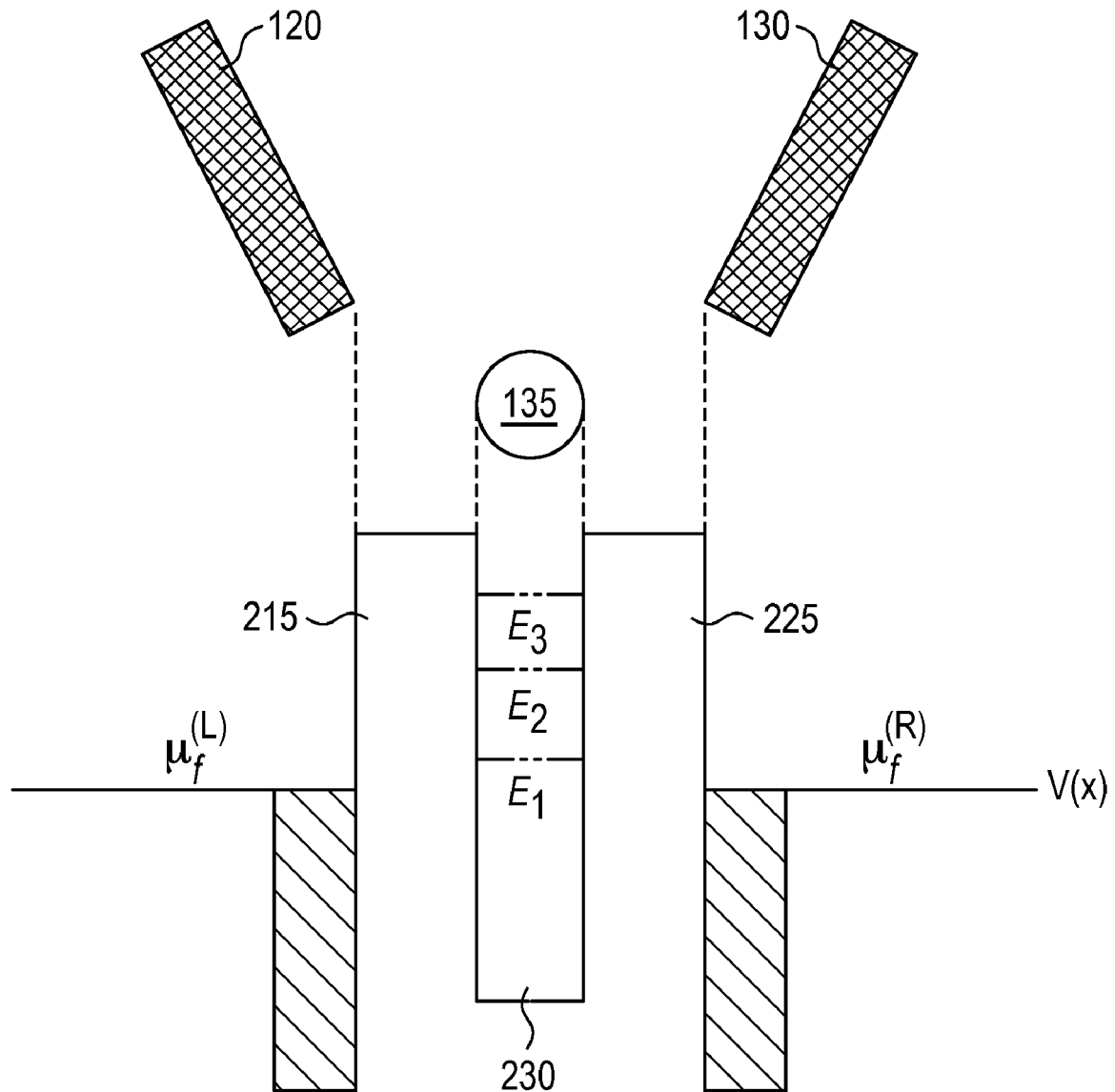
FIG. 2 is a conceptual diagram in accordance with the invention.

FIG. 2 shows a simple model physical system that shows the relevant characteristics of an embodiment in accordance with the invention as shown in FIGS. 1a-b. FIG. 2 shows a one-dimensional quantum mechanical representation of the physical system where the potential energy levels, $V(x)$, represent the identified physical regions as shown. The energy levels $\mu_f^{(L)}$ and $\mu_f^{(R)}$ correspond to the Fermi level of electrodes 120 and 130, respectively, and the height of potential barriers 215 and 225 roughly corresponds to the work function of the electrode material. The detailed shapes of potential barriers 215, 225 and quantum well 230 corresponding to scanned spot 135 are not important but the general characteristic of a quantum well with a distinct energy level spectrum that is separated by potential barriers from the tunneling electrodes is crucial. From straightforward quantum mechanical calculations it is well-known that for a double potential barrier as shown in FIG. 2, the transmission probability of a particle incident on potential barrier 215 is unity when its incident energy, $E_e$, matches one of the bound state energies, $E_1, E_2, E_3 \ldots$ of quantum well 230 and the integrated magnitudes of potential barriers 215 and 225 are equal.

Figure 3A:
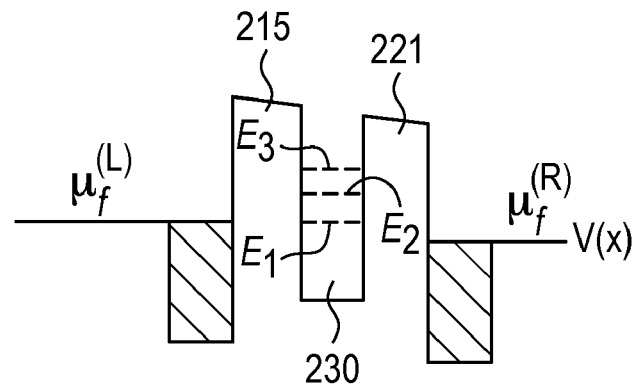
FIGS. 3a-c show the affect of various applied voltages on the Fermi level in accordance with the invention.
Figure 3B:
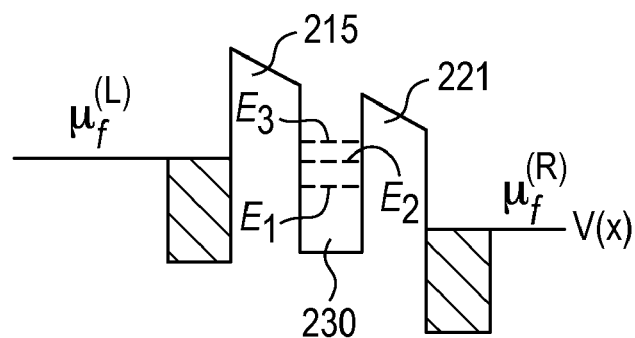
Figure 3C:
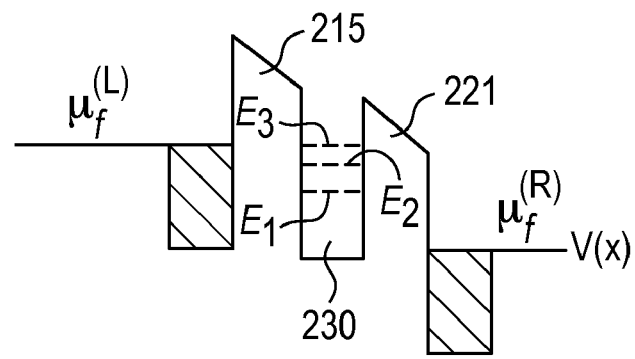
Figure 4A:
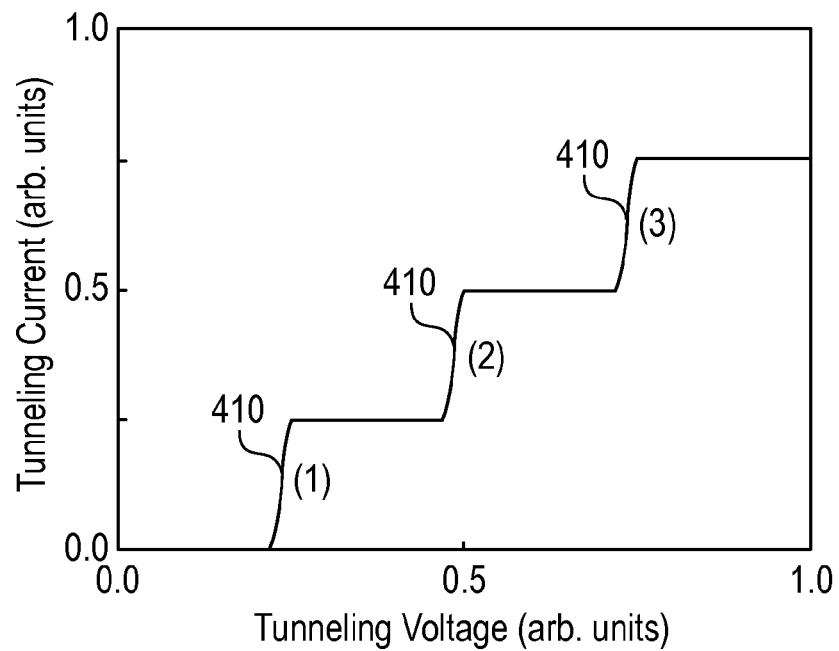
FIG. 4a shows the tunneling current as a function of tunneling voltage in accordance with the invention.
Figure 4B:
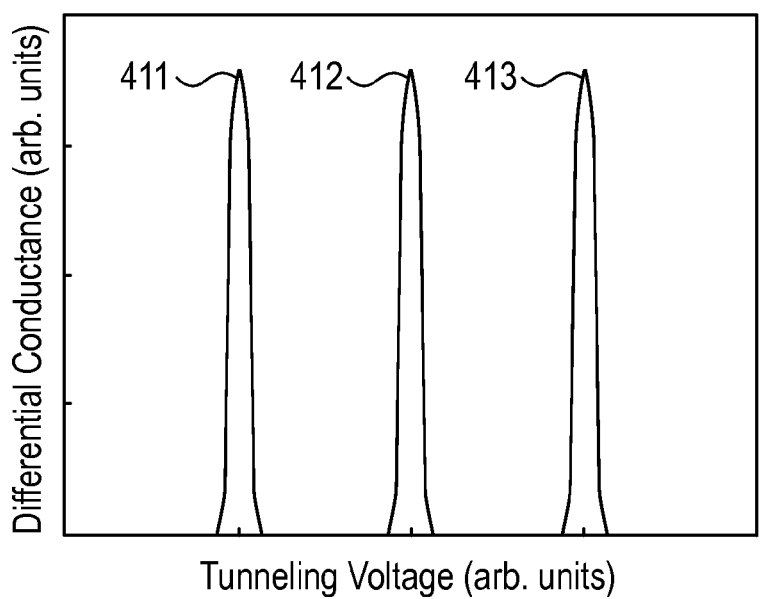
FIG. 4b shows the differential conductance as a function of tunneling voltage in accordance with the invention.

In accordance with the invention as shown in FIG. 1a, the tunneling voltage, $V_t$, applied across tunneling electrodes 120 and 130 is ramped over a range that results in the Fermi level, $\mu_f^{(L)}$ of electrode 120 being scanned over the energy spectrum of scanned spot 135 which is represented by quantum well 230. FIGS. 3a-c show that at specific applied voltages, the Fermi level, $\mu_f^{(L)}$, will sequentially match the bound state energies $E_1, E_2, E_3 \ldots$ of scanned spot 135 which typically results in a large increase in the tunneling current, $I_T$. Specifically, FIG. 3a shows the Fermi level, $\mu_f^{(L)}$, equal to the bound state energy, $E_1$; FIG. 3b shows the Fermi level, $\mu_f^{(L)}$, equal to the bound state energy, $E_2$; and FIG. 3c shows the Fermi level, $\mu_f^{(L)}$, equal to the bound state energy, $E_3$, for three different tunneling voltages, $V_t$, respectively. FIGS. 4a and 4b show the expected behavior of the measured tunneling current, $I_T$, and differential conductance, σ, respectively, as a function of tunneling voltage, $V_t$, for the situation shown in FIGS. 3a-c. The tunneling current, $I_T$, increases dramatically and then plateaus as the Fermi level reaches and then passes each of the bound state energies. This is due to the fact that when the Fermi level reaches a bound state energy of quantum well 230, there are now electrons in electrode 120 with energy that match this bound state energy, and resonant quantum tunneling can occur. As the Fermi level is increased further, resonant quantum tunneling can continue through this energy level, as there continue to exist electrons in electrode 120 available at the well bound state energy, and the tunneling current stays constant until an additional bound state energy is reached. The differential conductance, σ which is equal to the derivative of the tunneling current $I_T$, with respect to the tunneling voltage, $V_t$, or $\sigma = dI_T/dV_t$, correspondingly has isolated peaks at these transition energies between tunneling current plateaus.

The effects of a non-zero temperature for tunneling electrodes 120 and 130 are potentially significant. At zero temperature, the Fermi level denotes the energy below which all electron levels in the Fermi sea of electrodes 120 and 130 are occupied, and above which all electron levels in the Fermi sea of electrodes 120 and 130 are unoccupied. Thus, as the tunneling voltage, $V_t$, is increased and the Fermi level passes through a narrow well bound state energy, a very sharp turn-on of the tunneling current, $I_T$, occurs, as shown in FIG. 4a, and the differential conductance, σ, is very sharply peaked. However, for non-zero temperatures, the occupation numbers of the energy levels in the Fermi sea of electrodes 120 and 130 are smeared out due to thermal effects, and a number of levels near the Fermi energy are statistically occupied according to a Fermi-Dirac distribution function. This smearing of the occupation numbers of the electrode Fermi sea near the Fermi energy causes current steps 410 shown in FIG. 4a to be rounded, with a corresponding decrease and widening of differential conductance peaks 411, 412 and 413 shown in FIG. 4b. It is to be expected that, for some applications, this decrease in spectral resolution may have a material impact. For these situations, the RQTSM is typically operated at low temperature, in a manner similar to standard STM and AFM systems.

Figure 5A:
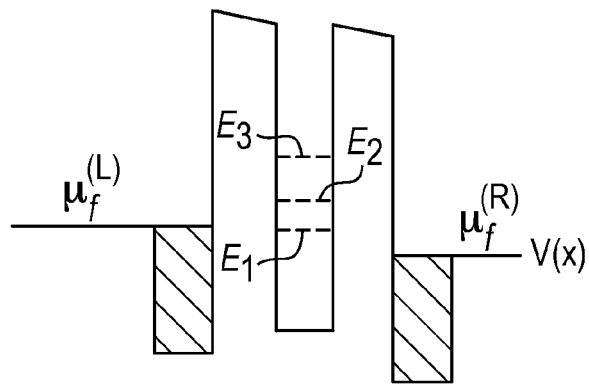
FIGS. 5a-c show the effect of various ramp voltages on the Fermi level in accordance with the invention.
Figure 5B:
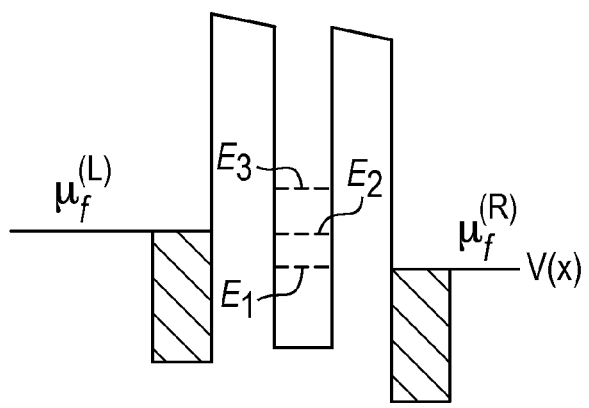
Figure 5C:
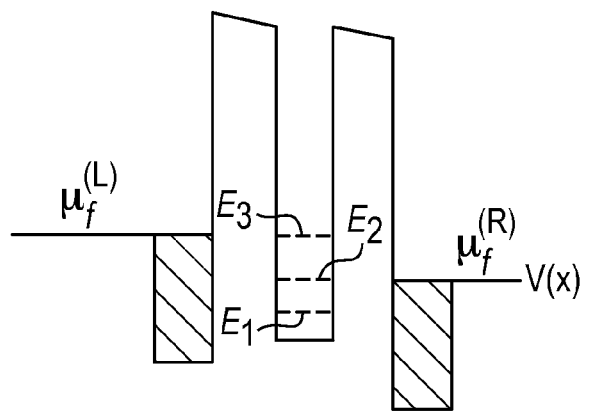

In an embodiment in accordance with the invention as shown in FIG. 1b, the tunneling voltage, $V_t$, applied across tunneling electrodes 120 and 130 is kept constant so that the Fermi level, $\mu_f^{(L)}$, does not change. Ramped voltage, $V_R$, is applied between metal layer 175 below target surface 110 and tunneling electrode voltage source 185. The effect of ramped voltage, $V_R$, is to vary the energy levels of scanned spot 135 which is represented by quantum well 230. FIGS. 5a-c show that at specific ramped voltages, $V_R$, the Fermi level, $\mu_f^{(L)}$, will sequentially match the modified bound state energies $E_1, E_2, E_3 \ldots$ of scanned spot 135 which typically results in a large increase in the tunneling current, $I_T$. Specifically, FIG. 5a shows a situation for a ramped voltage $V_{R0}$, and the Fermi level $\mu_f^{(L)}$ is equal to $E_1$. FIG. 5b shows the situation for ramped voltage, $V_R = E_2 - E_1 + V_{R0}$, and the fixed Fermi level is equal to $E_2$. FIG. 5c shows the situation for ramped voltage, $V_R = E_3 - E_1 + V_{R0}$, and the fixed Fermi level is now equal to $E_3$.

An examination of the one-dimensional quantum mechanical double-barrier transmission problem shows the conditions for resonant quantum tunneling (RQT). The Appendix shows the exact solution for the transmission problem for the one-dimensional quantum mechanical double-barrier and shows that the transmission probability only becomes unity when the energy, $E_e$, of an incident particle matches a bound state energy level and the integrated magnitude of potential barriers 215 and 225 are equal as noted above. For the double-barrier structure shown in FIG. 6, the non-resonant tunneling probability has the form:

$$T_{tot} \sim T_L \cdot T_R. \tag{1}$$

where $T_L$ and $T_R$ are the quantum mechanical tunneling probabilities through left potential barrier 215 and right potential barrier 225, respectively. The quantum mechanical tunneling probabilities, $T_{L,R}$ have an exponential dependence on the integrated magnitude of the potential barriers:

$$T_{L,R} \sim e^{-2K_{L,R}l} \quad \text{where} \tag{2}$$

$$K_{L,R} = \sqrt{\frac{2\mu(V_{L,R} - E_e)}{\hbar^2}} \tag{3}$$

where l is the barrier width, μ is the charge carrier mass and $(V_L - E_e)$ is the energy difference between the top of the left potential barrier 215, $V_L$, and the incident particle energy, $E_e$ and $(V_R - E_e)$ is the energy difference between the top of the right potential barrier 225, $V_R$, and the incident particle energy, $E_e$. For an order of magnitude estimate, it can be assumed that a single potential barrier has a typical height of about one eV and the single potential barrier width is typically about one nanometer for scanned spot 135 so that a single potential barrier tunneling probability is $T_{L,R} \approx 3 \times 10^{-5}$. These small probabilities are the limiting factors for the expected magnitude of the tunneling current, $I_T$.

Figure 6:
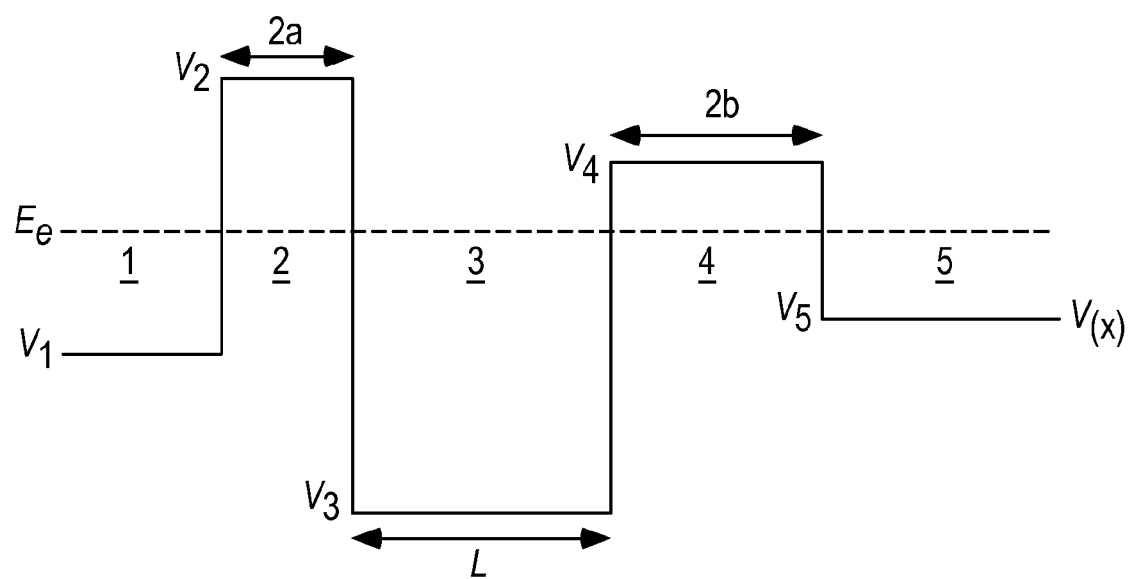
FIG. 6 shows a one dimensional conceptual model of the physical system in accordance with the invention.

A property of the double-barrier structure shown in FIG. 6 is that there can be large enhancements of the quantum mechanical transmission probability which results in a large enhancement of the tunneling current, $I_T$, when the incident particle energy, $E_e$ matches the bound state energies $E_1, E_2, E_3 \ldots$ of quantum well 230. Under certain conditions, the transmission probability becomes unity, independent of the magnitude of potential barriers 215 and 225. This is resonant quantum tunneling (RQT). As derived in the Appendix, the total transmission probability, $T_{tot}$, for the general double potential barrier structure such as that shown in FIG. 2 or FIGS. 3a-c has the form $$T_{tot} \sim \frac{1}{\left[\frac{A(E_e)}{T_L T_R} + B(E_e)\frac{T_L}{T_R} + C(E_e)\frac{T_R}{T_L} + D(E_e)T_R T_L\right]} \tag{4}$$

where A, B, C, D are factors of order unity that depend weakly on the incident particle energy, $E_e$. For non-resonant tunneling, $T_L$ and $T_R$ are much less than unity as discussed above so that Eq. (4) for $T_{tot}$ is dominated by the first term in the denominator giving Eq. (1)

$$T_{tot} \sim T_L \cdot T_R \tag{1}$$

When the resonant quantum tunneling conditions are met, the coefficient $A(E_e)$ in Eq. (4) goes to zero as shown in the Appendix. Eq. (4) is then dominated by a non-leading term. If potential barriers 215 and 225 are of equal integrated magnitudes, $T_L = T_R$, the total transmission probability, $T_{tot}$, is of order unity. The Appendix shows that for equal potential barriers at resonance $$T_{tot} = 1 \tag{5}$$

However, if $T_L \neq T_R$, the transmission probability remains negligible. For example, if $T_L \ll T_R$, the dominant term in Eq. (4) becomes $$T_{tot} \sim \frac{T_L}{T_R} \quad (6)$$

which is much less than unity. Similarly, if $T_L \gg T_R$, the dominant term in Eq. (4) becomes $$T_{tot} \sim \frac{T_R}{T_L} \quad (7)$$

as expected from symmetry considerations.

The enhanced spatial resolution provided in accordance with the invention using RQTSM can then be easily understood. For those regions on target surface 110 separated from scanned spot 135, tunneling barriers 215 and 225 are unequal and the left and right tunneling probabilities $T_L$ and $T_R$, respectively, are typically of significantly different magnitudes due to the exponential dependence of $T_L$ and $T_R$ on the integrated barrier magnitudes as shown by Eq. (2). In this case, as shown by Eqs. (6) and (7), the gain in transmission probability, $T_{tot}$, and tunneling current, $I_T$, is small. Only for scanned spot region 135 is the large tunneling current enhancement due to RQT operative.

APPENDIX

FIG. 6 shows the model physical system to be analyzed as one-dimensional quantum mechanical double-barrier structure 500. Structure 500 is analyzed by solving the one-dimensional, time independent Schroedinger equation for a fixed energy incident particle and determining the transmission probability. The parameters used in the calculation are shown in FIG. 6.

A1. Double Barrier Solution

It is assumed that the energy of the incident particle, $E_e$, is greater than the potential energy in all regions except for barrier regions 2 and 4. Under this condition, the general solutions, $\Psi_i$, to the one-dimensional, time independent Schroedinger equation in each of the five regions shown in FIG. 5 can be written as:

$$\Psi_1 = A_1 e^{ik_1 x} + B_1 e^{-ik_1 x} \quad (A1)$$

$$\Psi_2 = A_2 e^{ik_2 x} + B_2 e^{-ik_2 x} \quad (A2)$$

$$\Psi_3 = A_3 e^{ik_3 x} + B_3 e^{-ik_3 x} \quad (A3)$$

$$\Psi_4 = A_4 e^{ik_4 x} + B_4 e^{-ik_4 x} \quad (A4)$$

$$\Psi_5 = A_5 e^{ik_5 x} + B_5 e^{-ik_5 x} \quad (A5)$$

where $$\hbar k_{1,3,5} = \sqrt{2\mu(E_e - V_{1,3,5})} \quad (A6)$$

and $$\hbar k_{2,4} = \sqrt{2\mu(V_{2,4} - E_e)}. \quad (A7)$$

The solution specific solution is determined by matching $\Psi$ and $d\Psi/dx$ at the region interfaces. This procedure may be accomplished as a pair of subproblems. Matching the boundary conditions across the first barrier allows the wavefunction coefficients in region 1, $A_1$, $B_1$ to be written in terms of the wavefunction coefficients in region 3, $A_3$, $B_3$ $$\begin{pmatrix} A_1 \\ B_1 \end{pmatrix} = \begin{pmatrix} M_{11} & M_{12} \\ M_{21} & M_{22} \end{pmatrix} \begin{pmatrix} A_3 \\ B_3 \end{pmatrix} \quad (A8)$$

where $$M_{11} = \frac{-i(k_1^2 + k_2^2)^{1/2}(k_2^2 + k_3^2)^{1/2} e^{i(k_1+k_3)a} (e^{2k_2 a + i(\phi_2+\phi_3)} - e^{-2k_2 a - i(\phi_2+\phi_3)})}{4k_1 k_2} \quad (A9)$$

$$M_{12} = \frac{-i(k_1^2 + k_2^2)^{1/2}(k_2^2 + k_3^2)^{1/2} e^{i(k_1-k_3)a} (e^{2k_2 a + i(\phi_2-\phi_3)} + e^{-2k_2 a - i(\phi_2-\phi_3)})}{4k_1 k_2} \quad (A10)$$

$$M_{22} = M_{11}^* \quad (A11)$$

$$M_{21} = M_{12}^* \quad (A12)$$

and $$\phi_2 = a\tan(k_2/k_1) \quad (A13)$$

$$\phi_3 = a\tan(k_2/k_3). \quad (A14)$$

Similarly, matching the boundary conditions across the second barrier allows the wavefunction coefficients in region 3, $A_3$, $B_3$ to be written in terms of the coefficients in region 5, $A_5$, $B_5$ $$\begin{pmatrix} A_3 \\ B_3 \end{pmatrix} = \begin{pmatrix} N_{11} & N_{12} \\ N_{21} & N_{22} \end{pmatrix} \begin{pmatrix} A_5 \\ B_5 \end{pmatrix} \quad (A15)$$

where $$N_{11} = \frac{-i(k_3^2 + k_4^2)^{1/2}(k_4^2 + k_5^2)^{1/2} e^{-ik_3(a+L)+ik_5 b} (e^{2k_4 b + i(\phi_4+\phi_5)} - e^{-2k_4 b - i(\phi_4+\phi_5)})}{4k_3 k_4} \quad (A16)$$

$$N_{12} = \frac{-i(k_3^2 + k_4^2)^{1/2}(k_4^2 + k_5^2)^{1/2} e^{-ik_3(a+L)+ik_5 b} (-e^{2k_4 b + i(\phi_4+\phi_5)} + e^{-2k_4 b - i(\phi_4+\phi_5)})}{4k_3 k_4} \quad (A17)$$

$$N_{22} = N_{11}^* \quad (A18)$$

$$N_{21} = N_{12}^* \quad (A19)$$

and $$\phi_4 = a\tan(k_4/k_3) \quad (A20)$$

$$\phi_5 = a\tan(k_4/k_5). \quad (A21)$$

The full expression connecting the wavefunction coefficients of region 1 with those of region 5 is then determined by the linear transformation using Eqs. (A8) and A(15)

$$\begin{pmatrix} A_1 \\ B_1 \end{pmatrix} = \begin{pmatrix} M_{11} & M_{12} \\ M_{21} & M_{22} \end{pmatrix} \begin{pmatrix} N_{11} & N_{12} \\ N_{21} & N_{22} \end{pmatrix} \begin{pmatrix} A_5 \\ B_5 \end{pmatrix}. \quad (A22)$$

The full transmission coefficient is determined by applying the boundary condition $$\begin{pmatrix} A_1 = 1 \\ B_1 \end{pmatrix} = \begin{pmatrix} M_{11} & M_{12} \\ M_{21} & M_{22} \end{pmatrix} \begin{pmatrix} N_{11} & N_{12} \\ N_{21} & N_{22} \end{pmatrix} \begin{pmatrix} A_5 \\ B_5 = 0 \end{pmatrix} \quad \text{(A23)}$$

which corresponds to an incident wave of unit amplitude from the left ($A_1=1$) in FIG. 5 and no wave incident from the right ($B_5=0$) in FIG. 5. Hence, the total transmission probability is given by $$T_{tot} = \frac{k_5}{k_1} \left| \frac{1}{M_{11}N_{11} + M_{12}N_{21}} \right|^2. \quad \text{(A24)}$$

Explicit evaluation of Eq. (A24) and collecting and grouping terms gives $$T_{tot} = \frac{2^6 k_1 k_2^2 k_3^2 k_4^2 k_5}{(k_1^2 + k_2^2)(k_2^2 + k_3^2)(k_3^2 + k_4^2)(k_4^2 + k_5^2)} \frac{1}{F} \quad \text{(A25)}$$

where $$\begin{aligned}
F = & e^{2\gamma_2 + 2\gamma_4} \sin^2(\phi_1 - \phi_3 - \phi_4) + \\
& e^{2\gamma_2} \cos(2\phi_5)(-\cos(2\phi_4) + \cos(2\phi_1 - 2\phi_3)) + \\
& e^{2\gamma_4} \cos(2\phi_2)(-\cos(2\phi_3) + \cos(2\phi_1 - 2\phi_4)) + \\
& e^{2\gamma_2 - 2\gamma_4} \sin^2(\phi_1 - \phi_3 - \phi_4) + e^{2\gamma_4 - 2\gamma_2} \sin^2(\phi_1 + \phi_3 - \phi_4) + \\
& e^0 \cos(2\phi_2 - 2\phi_5)(-\cos(2\phi_1) + \cos(2\phi_3 - 2\phi_4)) + \\
& e^0 \cos(2\phi_2 + 2\phi_5)(-\cos(2\phi_1) + \cos(2\phi_3 + 2\phi_4)) + \\
& e^{-2\gamma_4} \cos(2\phi_2)(-\cos(2\phi_3) + \cos(2\phi_1 + 2\phi_4)) + \\
& e^{-2\gamma_2} \cos(2\phi_5)(-\cos(2\phi_4) + \cos(2\phi_1 + 2\phi_3)) + \\
& e^{-2\gamma_2 - 2\gamma_4} \sin^2(\phi_1 + \phi_3 + \phi_4)
\end{aligned} \quad \text{(A26)}$$

and the terms of F are listed in descending powers of the large "barrier suppression factors" and where $$\Phi_1 \equiv k_3 L \quad \text{(A27)}$$

$$\gamma_2 \equiv 2k_2 a \quad \text{(A28)}$$

$$\gamma_4 \equiv 2k_4 b. \quad \text{(A29)}$$

A2. Resonance Condition

Assuming the potential bafflers are strong impediments to particle transmission, i.e. $e^{2\gamma_2}, e^{2\gamma_4} \gg 1$, for general non-resonant conditions the total transmission is dominated by the leading term in Eq. (A26) giving $$T_{tot} \sim e^{-2\gamma_2 - 2\gamma_4} \sim T_L T_R. \quad \text{(A30)}$$

However, for the situation when $$\phi_1 - \phi_3 - \phi_4 = n\pi \quad \text{(A31)}$$

the coefficients of the first three terms in Eq. (A26) are zero. If the two potential bafflers are of equal integrated magnitudes, i.e. $\gamma_2 = \gamma_4$, then the leading term in Eq. (A26) is of the order unity, and the total transmission coefficient can be shown to approach unity. This is the condition for resonant quantum tunneling and exhibits the property of total transmission through a double potential barrier structure, regardless of the strength of the individual bafflers as long as the potential barriers are of equal integrated magnitudes.

It is important to understand the physical significance of the resonance condition of Eq. (A31). To simplify the discussion, the completely symmetric case will be considered where $$\phi_3 = a\tan(k_2/k_3) = a\tan(k_4/k_3) = \phi_4 \quad \text{(A32)}$$

which gives $$\sin(\phi_1 - 2\phi_3) = 0. \quad \text{(A33)}$$

Using trigonometric identities and substituting the definitions for $\phi_1$ and $\phi_3$, allows Eq. (A33) to be rewritten as $$\tan(k_3 L) = \frac{\sqrt{V_2 - E_e} \sqrt{E_e - V_3}}{E_e - (V_2 + V_3)/2}. \quad \text{(A34)}$$

If the arbitrary baseline for the potential energy is chosen to be $V_3 \equiv 0$ and $V_2$ is renamed $V_0$, Eq. (A34) becomes $$\tan(k_3 L) = \frac{\sqrt{V_0 - E_e} \sqrt{E_e}}{E_e - V_0/2}. \quad \text{(A35)}$$

Eq. (A35) is the eigenvalue equation for the energy levels of a quantum square well potential with the parameters as defined above. This shows why the phenomenon of total transmission through a double-well structure is called resonant quantum tunneling. The condition for resonant quantum tunneling is that the energy, $E_e$, of the incident particle matches any of the bound state energy levels of the quantum square well. Whenever the incident energy, $E_e$, matches any of the bound state energy levels, the total transmission probability increases dramatically, as long as the double potential barriers are symmetric.

A3. Tunneling Current on Resonance

As discussed above, for a symmetric potential barrier structure, the transmission probability becomes unity when the incident energy, $E_e$, passes through a bound state energy level of the quantum square well. However, the situation is different for a double potential barrier structure that has asymmetric potential barriers. For the general asymmetric potential barrier structure on resonance, it follows from Eq. (A26) that the dominant terms have the form $$F \sim e^{2\gamma_2 - 2\gamma_4} \sin^2(\phi_1 - \phi_3 + \phi_4) + e^{2\gamma_4 - 2\gamma_2} \sin^2(\phi_1 + \phi_3 - \phi_4). \quad \text{(A36)}$$

This implies that for the situation where the left potential baffler in FIG. 5 is larger than the right potential barrier in FIG. 5 ($\gamma_2 \gg \gamma_4$)

$$T_{tot} \sim e^{2\gamma_4 - 2\gamma_2} \sim \frac{T_L}{T_R} \quad \text{(A37)}$$

and for the reverse situation ($\gamma_4 \gg \gamma_2$)

$$T_{tot} \sim e^{2\gamma_2 - 2\gamma_4} \sim \frac{T_R}{T_L}. \quad \text{(A38)}$$

This shows the different resonant tunneling behavior for the asymmetric double potential barrier structure. If the potential baffler structure is highly asymmetric, there is very little gain in the tunneling probability as the resonance condition is approached. Only under the condition of double potential baffler symmetry is resonant quantum tunneling in effect.

The invention claimed is:

1. An apparatus for resonant quantum tunneling microscopy comprising:

a tip support structure;

first and second tunneling electrodes comprising first and second tips, said first and said second tunneling electrodes mechanically coupled to said tip support structure such that said first and said second tips are separated by a distance less than several nanometers and sufficiently large that resonant quantum tunneling does not occur directly between said first and said second tips.

2. The apparatus of claim 1 wherein an insulating xyz scanner is mechanically coupled to said tip support structure.

3. The apparatus of claim 2 wherein said insulating xyz scanner comprises a piezoelectric tube.

4. The apparatus of claim 1 wherein a vertical control actuator is mechanically coupled to said tip support structure.

5. The apparatus of claim 4 wherein said vertical control actuator comprises an electrostatic stepper motor.

6. The apparatus of claim 1 wherein said first tunneling electrode comprises a nanotube structure.

7. The apparatus of claim 1 wherein said tip support structure is microfabricated from silicon.

8. The apparatus of claim 1 wherein said first and said second tunneling electrodes are electrically coupled to a voltage source.

9. The apparatus of claim 1 wherein said first and said second tunneling electrodes are coupled to a current measuring device.

10. The apparatus of claim 1 wherein said apparatus is enclosed in a structure to allow for operation in a high vacuum environment.

11. An apparatus for resonant quantum tunneling microscopy comprising:

a tip support structure;

first and second tunneling electrodes comprising first and second tips, said first and said second tunneling electrodes mechanically coupled to said tip support structure such that said first and said second tips are separated by a distance that allows the flow of a tunneling current from said first tip to said second tip when said first and said second tips are proximate to a scanned spot.

12. The apparatus of claim 11 wherein an insulating xyz scanner is mechanically coupled to said tip support structure.

13. The apparatus of claim 12 wherein said insulating xyz scanner comprises a piezoelectric tube.

14. The apparatus of claim 11 wherein a vertical control actuator is mechanically coupled to said tip support structure.

15. The apparatus of claim 14 wherein said vertical control actuator comprises an electrostatic stepper motor.

16. The apparatus of claim 11 wherein said first tunneling electrode comprises a nanotube structure.

17. The apparatus of claim 11 wherein said tip support structure is microfabricated from silicon.

18. The apparatus of claim 11 wherein said first and said second tunneling electrodes are electrically coupled to a voltage source.

19. The apparatus of claim 11 wherein said first and said second tunneling electrodes are coupled to a current measuring device.

20. The apparatus of claim 11 wherein said apparatus is enclosed in a structure to allow for operation in a high vacuum environment.

* * * * *